(12) United States Patent
Koito et al.

(10) Patent No.: US 10,048,495 B2
(45) Date of Patent: Aug. 14, 2018

(54) DISPLAY DEVICE

(71) Applicant: Japan Display Inc., Minato-ku (JP)

(72) Inventors: Takeo Koito, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 75 days.

(21) Appl. No.: 15/168,773

(22) Filed: May 31, 2016

(65) Prior Publication Data

US 2017/0031157 A1 Feb. 2, 2017

(30) Foreign Application Priority Data

Jul. 29, 2015 (JP) .................................. 2015-149581

(51) Int. Cl.
| | |
|---|---|
| *G02B 5/30* | (2006.01) |
| *G02B 27/00* | (2006.01) |
| *G02B 5/124* | (2006.01) |
| *G02F 1/1335* | (2006.01) |
| *G02F 1/13363* | (2006.01) |
| *G02F 1/1343* | (2006.01) |

(52) U.S. Cl.
CPC ......... *G02B 27/0018* (2013.01); *G02B 5/124* (2013.01); *G02B 5/3083* (2013.01); *G02F 1/13363* (2013.01); *G02F 1/133536* (2013.01); *G02F 1/134309* (2013.01); *G02B 5/3058* (2013.01); *G02F 2001/133548* (2013.01); *G02F 2001/133638* (2013.01); *G02F 2001/134372* (2013.01); *G02F 2413/08* (2013.01)

(58) Field of Classification Search
CPC .. G02B 5/3083; G02B 5/124; G02B 27/0018; G02F 2001/133638

USPC .............. 359/485.01, 489.07, 530, 614
See application file for complete search history.

(56) References Cited

U.S. PATENT DOCUMENTS

| | | | | | |
|---|---|---|---|---|---|
| 3,709,580 | A | * | 1/1973 | Fugitt | G02B 23/22 359/488.01 |
| 5,061,050 | A | * | 10/1991 | Ogura | G02B 5/3033 359/487.04 |
| 5,422,756 | A | * | 6/1995 | Weber | G02B 5/124 359/485.03 |
| 5,559,634 | A | * | 9/1996 | Weber | G02B 5/124 359/485.04 |
| 5,726,806 | A | * | 3/1998 | Holden | G02B 27/01 359/630 |
| 5,764,411 | A | * | 6/1998 | Shanks | G02B 27/2292 359/485.02 |
| 5,861,993 | A | * | 1/1999 | Shanks | G02B 5/124 359/629 |

(Continued)

FOREIGN PATENT DOCUMENTS

JP 2011-253128 12/2011

*Primary Examiner* — Ricky D Shafer
(74) *Attorney, Agent, or Firm* — Oblon, McClelland, Maier & Neustadt, L.L.P.

(57) ABSTRACT

According to one embodiment, a display device, includes a retroreflective element includes a base, and first and second retroreflectors each retroreflecting light made incident without transmitting the base, and a retarder element disposed between a display module and a polarizing element and between the retroreflective element and the polarizing element, the first and second retroreflectors being adjacent to each other, each of the first and second retroreflectors includes a recess portion on a side facing the retarder element.

17 Claims, 9 Drawing Sheets

(56) References Cited

U.S. PATENT DOCUMENTS

2015/0248014 A1\* 9/2015 Powell ................. G02B 3/0006
                                                    349/10
2017/0242173 A1\* 8/2017 Numata ............... G02B 5/3083

\* cited by examiner

DISPLAY DEVICE

CROSS-REFERENCE TO RELATED APPLICATIONS

This application is based upon and claims the benefit of priority from Japanese Patent Application No. 2015-149581, filed Jul. 29, 2015, the entire contents of which are incorporated herein by reference.

FIELD

Embodiments described herein relate generally to a display device.

BACKGROUND

An imaging device comprising, for example, a polarizing filter and a retroreflective prism has been proposed. In the imaging device, a real image representing a display image is formed at a position of plane symmetry with an emission point of display light representing the display image about the polarizing filter. Incidentally, the retroreflective prism includes an even surface and an uneven back surface. Light reaching the back surface, of the light incident on the retroreflective prism, is retroreflected, but the light reflected on the surface forms an image at a position different from the retroreflected light. For this reason, the retroreflected light may be visually recognized as what is called ghost and may cause deterioration in display quality. In addition, the light reflected on the surface of the retroreflective prism may cause reduction in light use efficiency since the light does not contribute to the display of the real image.

DETAILED DESCRIPTION

In general, according to one embodiment, a display device, includes: a display module emitting display light; a polarizing element which includes a transmission axis transmitting first linearly polarized light and reflects second linearly polarized light perpendicular to the transmission axis; a retroreflective element comprising a base, and first and second retroreflectors each retroreflecting light made incident without transmitting the base; and a retarder element disposed between the display module and the polarizing element and between the retroreflective element and the polarizing element to add a retardation to transmitted light, the first and second retroreflectors being adjacent to each other, each of the first and second retroreflectors comprising a recess portion on a side facing the retarder element.

According to another embodiment, a display device, includes: a display module emitting display light which is circularly polarized light; a polarizing element transmitting and reflecting part of incident light; a first retarder element adding a retardation to transmitted light; and a retroreflective element comprising a base, and retroreflectors each retroreflecting light made incident without transmitting the base, light reflected on the retroreflective element and transmitting the first retarder element and the polarizing element being linearly polarized light.

According to yet another embodiment, a display device, includes: a polarizing element which includes a transmission axis transmitting first linearly polarized light and reflects second linearly polarized light perpendicular to the transmission axis; a retarder element adding a retardation to transmitted light; and a retroreflective element comprising a base, retroreflectors each retroreflecting light made incident without transmitting the base, and a light-shielding film shielding a non-retroreflective portion adjacent to the retroreflectors from light.

Embodiments are described with reference to accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. Furthermore, in the specification and drawings, constituent elements having the same or similar functions as those described in connection with preceding drawings are denoted by like reference numerals and duplicated detailed explanations may be arbitrarily omitted.

Figure 1:
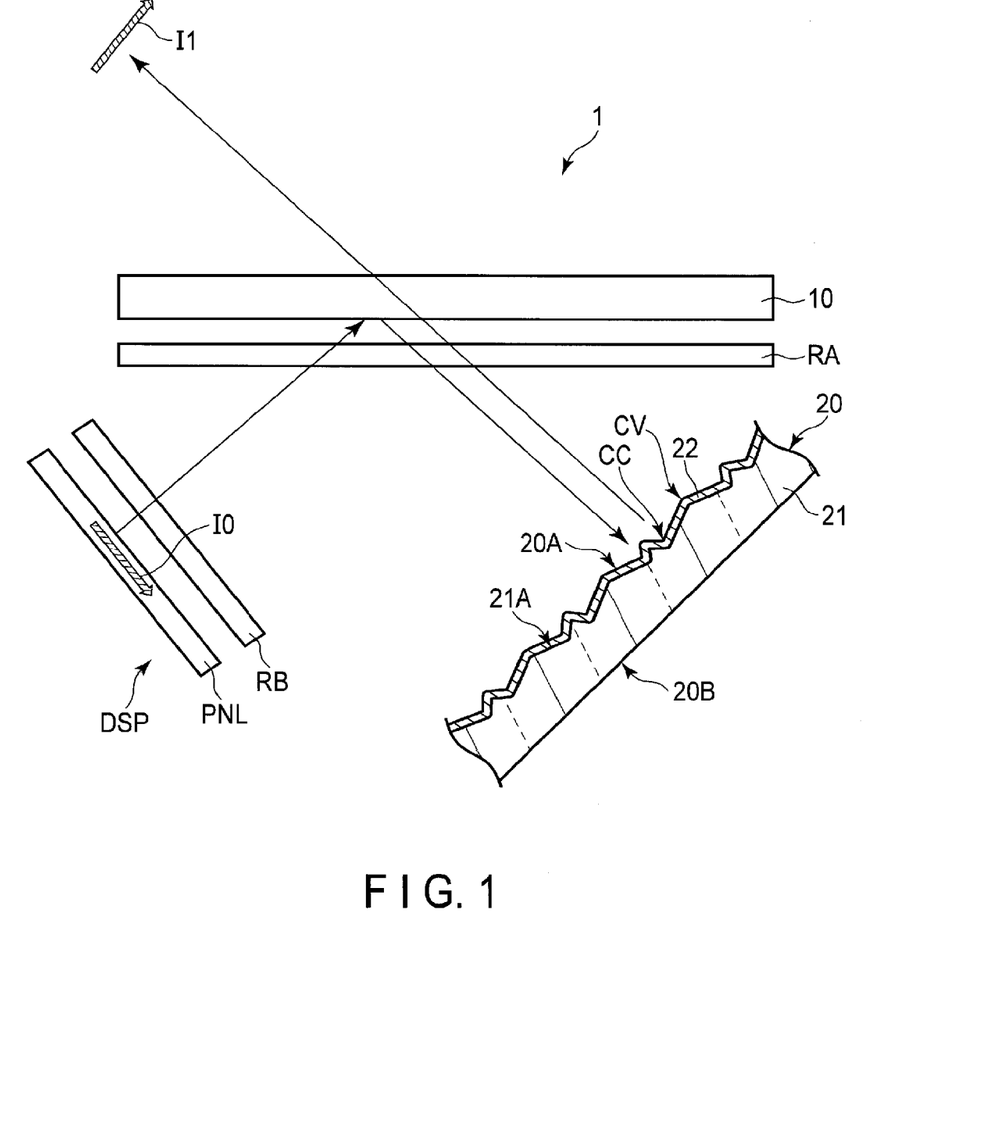
FIG. 1 is an illustration showing a configuration example of a display device 1 of the present embodiments.

FIG. 1 is an illustration showing a configuration example of a display device 1 of the present embodiments. The display device 1 comprises a display module DSP, a polarizing element 10, a retarder element RA, a retroreflective element 20 and the like.

The display module DSP emits the display light which is circularly polarized light, but its configuration is not particularly limited. In the example illustrated, the display module DSP comprises a display panel PNL and a retarder element RB. The display panel PNL is, for example, a liquid crystal display panel which holds a liquid crystal layer between a pair of substrates. However, the display panel PNL may be a self-luminous display panel comprising an organic electroluminescent element and the like, an electronic paper display panel comprising a cataphoretic element and the like, a display panel employing micro-electromechanical systems (MEMS), or a display panel employing electrochromism. The liquid crystal display panel may be a transmissive display panel which displays an image by allowing light from a light source device to be selectively transmitted, a reflective display panel which displays an image by allowing external light or the light from the light source device to be selectively transmitted, or a semitransmissive display panel having display functions of both the transmissive display panel and the reflective display panel.

The display panel PNL emits the display light representing a display image I0. The display light is, for example, linearly polarized light. The retarder element RB is opposed substantially parallel to the display panel PNL. The retarder element RB may be bonded to the emission surface side of the display panel PNL. The retarder element RB is, for example, a λ/4 plate which imparts a retardation of approximately λ/4 to the transmitted light. λ indicates a wavelength of the transmitted light. The retarder element RB is disposed such that its slow axis intersects a polarization plane of the linearly polarized light at an angle of 45° though detailed explanations are omitted here. In the display module DSP, the display light (linearly polarized light) emitted from the display panel PNL transmits the retarder element RB and is converted into circularly polarized light. In the present embodiments, the circularly polarized light includes elliptically polarized light.

If the light emitted from the display panel PNL is the circularly polarized light, the retarder element RB is not disposed in the display module DSP. In addition, the display module DSP may include a screen to which light emitted from a projector is projected or a display medium (poster or the like) illuminated by an illumination device, instead of the display panel.

The polarizing element 10 comprises a transmission axis transmitting first linearly polarized light and reflects second linearly polarized light which intersects the transmission axis. For example, the first linearly polarized light is a P wave parallel to the plane of incidence and the second linearly polarized light is an S wave perpendicular to the plane of incidence. The polarizing element 10 is composed of, for example, a wire-grid polarizing filter, a reflective polarizing film using a brightness enhancement film, a multi-layered body formed by overlaying the reflective polarizing film and the linear polarizer or the like. If the polarizing element 10 is composed of the multi-layered body, the linear polarizer is disposed on the reflective polarizing film (i.e., on a side opposite to the side opposed to the retarder element RA) and has a transmission axis parallel to the transmission axis of the reflective polarizing film.

The retarder element RA is opposed substantially parallel to the polarizing element 10. The retarder element RA may be bonded to the side of the polarizing element 10 which is opposed to the display module DSP and the retroreflective element 20. In other words, the retarder element RA is disposed between the display module DSP and the polarizing element 10, and between the retroreflective element 20 and the polarizing element 10. The retarder element RA is, for example, a λ/4 plate which imparts a retardation of approximately λ/4 to the transmitted light. λ indicates a wavelength of the transmitted light. The retarder element RA is disposed such that its slow axis intersects a polarization plane of the linearly polarized light at an angle of 45° though detailed explanations are omitted here.

The retroreflective element 20 includes a retroreflective surface 20A on which the incident light is retroreflected, on the side opposed to the retarder element RA. The retroreflective surface 20A is an uneven surface including a recess portion CC located on a side facing the retarder element RA and a protruding portion CV which protrudes toward the retarder element RA.

More specifically, the retroreflective element 20 comprises a base 21 and a metallic thin film 22. The base 21 is formed of, for example, a resin material. A surface 21A of the base 21 is an uneven surface similar to the retroreflective surface 20A. In the example illustrated, a back surface 20B of the retroreflective element 20 (i.e., a back surface of the base 21 in the example illustrated) is an even surface. The metallic thin film 22 covers the surface 21A of the base 21. The metallic thin film 22 has a substantially uniform thickness. The metallic thin film 22 is formed of, for example, a material having an optical reflectivity such as silver (Ag), aluminum (Al) or an aluminum alloy. The metallic thin film 22 forms the retroreflective surface 20A. In other words, in the example illustrated, the retroreflective element 20 comprises an uneven surface (retroreflective surface 20A) on the inner side of the display device 1 on which various optical members such as the retarder elements RA and RB are disposed, and an even surface (back surface 20B) on the outer side of the display device 1. The metallic thin film 22 may be subjected to surface treatment to prevent corrosion or may be coated with an inorganic material such as silicon nitride (SiN). In addition, if the base 21 is formed of a material having the optical reflectivity, the surface of the base 21 may form the retroreflective surface 20A. The transmittance on the retroreflective surface 20A is substantially zero, and most of the light incident on the retroreflective surface 20A does not reach the back surface 20B of the retroreflective element 20. In other words, most of the light incident on the retroreflective element 20 is retroreflected on the retroreflective surface 20A without transmitting the base 21.

In the figure, I1 corresponds to a real image of the display image I0 and is formed at a position of plane symmetry about the polarizing element 10. The light forming the real image I1 is the linearly polarized light transmitting the polarizing element 10.

Next, a detailed example of each constituent element will be hereinafter explained.

Figure 2:
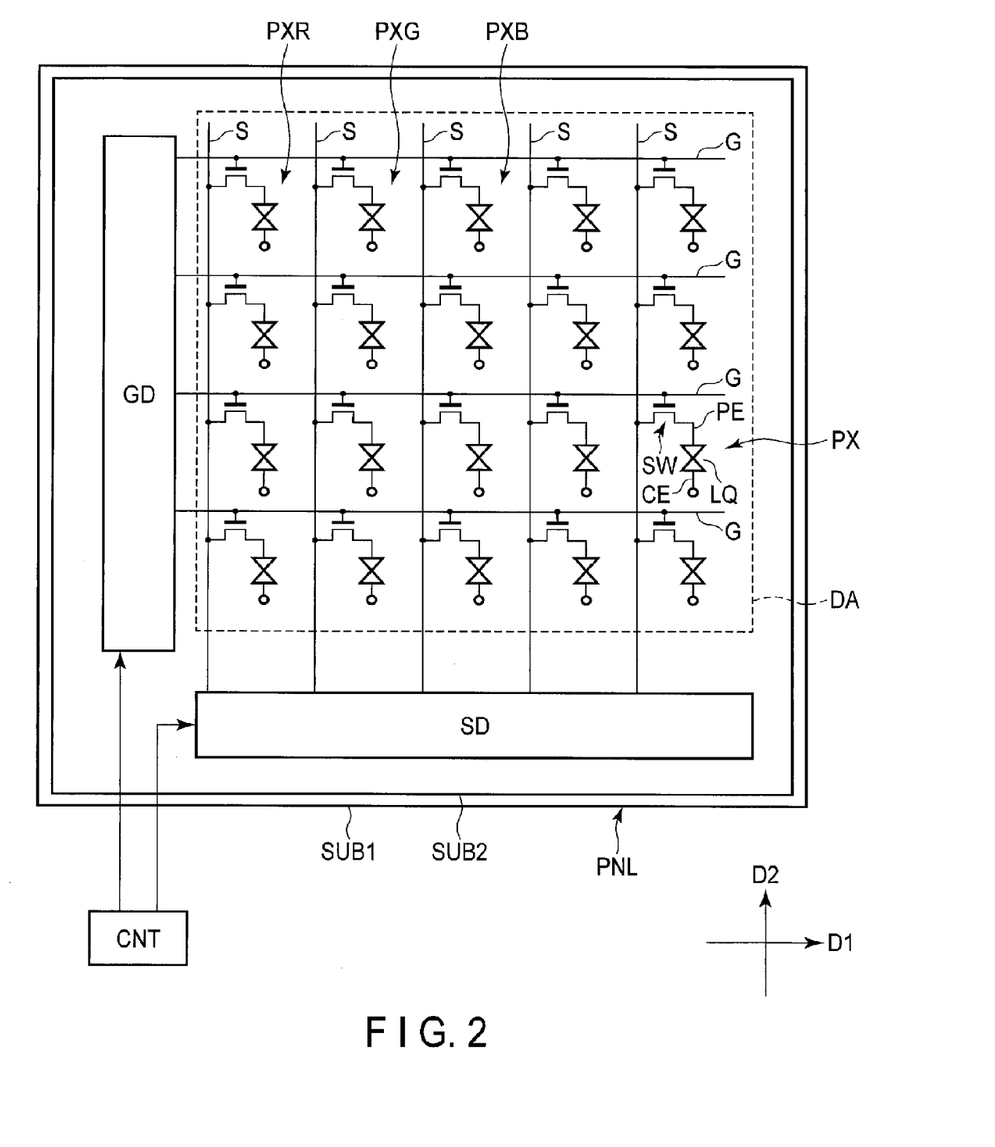
FIG. 2 is an illustration showing a configuration example of the display panel PNL shown in FIG. 1.

FIG. 2 is an illustration showing a configuration example of the display panel PNL shown in FIG. 1. An active-matrix-driving transmissive liquid crystal display panel will be explained as an example of the display panel PNL. The display panel PNL includes a first substrate SUB1, a second substrate SUB2 opposed to the first substrate SUB1, and a liquid crystal layer LQ held between the first substrate SUB1 and the second substrate SUB2. The first substrate SUB1 and the second substrate SUB2 are bonded to each other with a predetermined cell gap formed between the substrates. The display panel PNL includes a display area DA where an image is displayed. The display area DA includes sub-pixels PX arrayed in a matrix.

The display area DA includes, for example, a red pixel PXR exhibiting a red color, a green pixel PXG exhibiting a green color, and a blue pixel PXB exhibiting a blue color, as the sub-pixels PX. It should be noted that the display area DA may further include a pixel of a color different from red, green and blue (for example, a white pixel exhibiting a white color). Each pixel is composed of the sub-pixels PX of the different colors to implement the color display. The pixel is a minimum unit to form a color image. In the example illustrated, the pixel is composed of the red pixel PXR, the green pixel PXG, and the blue pixel PXB.

The red pixel PXR includes a red color filter and is formed to transmit red light mainly, of the white light from the light source device. The green pixel PXG includes a green color filter and is formed to transmit green light mainly, of the white light from the light source device. The blue pixel PXB includes a blue color filter and is formed to transmit blue light mainly, of the white light from the light source device.

The color filters may be formed on the first substrate SUB1 or the second substrate SUB2 though not explained in detail.

The first substrate SUB1 includes gate lines G extending along a first direction D1 and source lines S extending along a second direction D2 and intersecting the gate lines G. Each of the gate lines G is led to the outside of the display area DA and is connected to a gate driver GD. Each of the source lines S is led to the outside of the display area DA and is connected to a source driver SD. The gate driver GD and the source driver SD are connected to a controller CNT. The controller CNT generates control signals, based on a video signal, to control the gate driver GD and the source driver SD.

Each of the sub-pixels PX includes a switching element SW, a pixel electrode PE, a common electrode CE and the like. The switching element SW is electrically connected to the gate line G and the source line S. The switching element SW is composed of, for example, a thin film transistor. The pixel electrode PE is electrically connected to the switching element SW. The common electrode CE is opposed to the pixel electrode PE.

Detailed explanation of the configuration of the display panel PNL is omitted here but, the pixel electrode PE is disposed on the first substrate SUB1 while the common electrode CE is disposed on the second substrate SUB2, in a display mode using a longitudinal electric field extending along the normal line of the main surface of the substrate or a display mode using a tilted electric field which is tilted obliquely with respect to the main surface of the substrate. In addition, both the pixel electrode PE and the common electrode CE are disposed on the first substrate SUB1, in a display mode using a lateral electric field extending along the main surface of the substrate. Furthermore, the display panel PNL may be configured to correspond to a display mode using an arbitrary combination of the longitudinal electric field, the lateral electric field, and the tilted electric field. The main surface of the substrate corresponds to a plane defined by the first direction D1 and the second direction D2.

Figure 3:
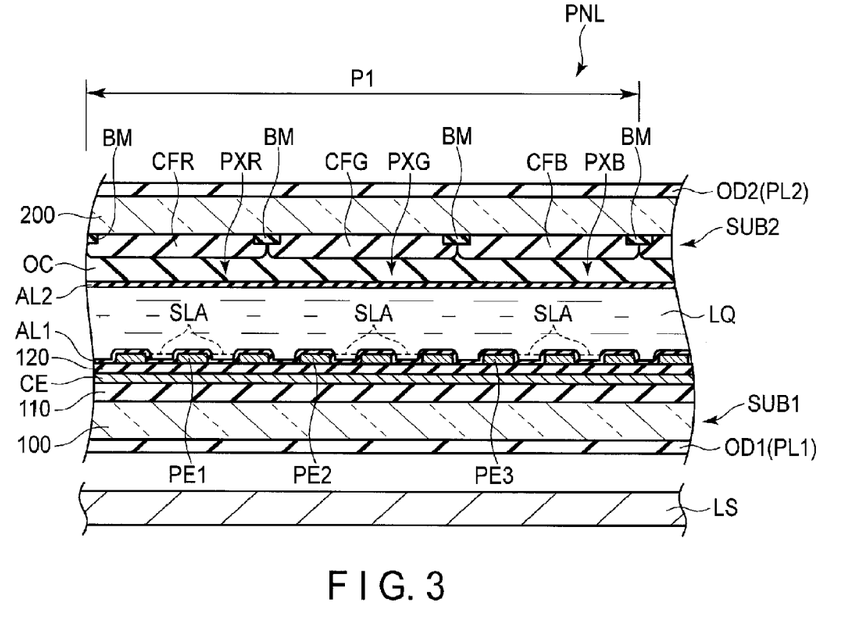
FIG. 3 is a cross-sectional view showing the configuration example of the display panel PNL shown in FIG. 2.

FIG. 3 is a cross-sectional view showing the configuration example of the display panel PNL shown in FIG. 2. A cross-sectional structure of the display panel PNL using a fringe field switching (FFS) mode which is one of the display modes using the lateral electric field will be explained in brief.

The first substrate SUB1 includes a first insulating substrate 100, a first insulating film 110, the common electrode CE, a second insulating film 120, pixel electrodes PE1 to PE3, a first alignment film AL1 and the like. The common electrode CE extends across the red pixel PXR, the green pixel PXG and the blue pixel PXB. Each of a pixel electrode PE1 of the red pixel PXR, a pixel electrode PE2 of the green pixel PXG, and a pixel electrode PE3 of the blue pixel PXB is opposed to the common electrode CE and includes slits SLA. In the example illustrated, the common electrode CE is located between the first insulating film 110 and the second insulating film 120, and the pixel electrodes PE1 to PE3 are located between the second insulating film 120 and the first alignment film AL1. The pixel electrodes PE1 to PE3 may be located between the first insulating film 110 and the second insulating film 120, and the common electrode CE may be located between the second insulating film 120 and the first alignment film AL1. In this case, the slits SLA are formed on the common electrode CE.

The second substrate SUB2 includes a second insulating substrate 200, a light-shielding layer BM, color filters CFR, CFG and CFB, an overcoat layer OC, a second alignment film AL2, and the like. The color filters CFR, CFG and CFB are opposed to the pixel electrodes PE1 to PE3, respectively, through the liquid crystal layer LQ. The color filter CFR is a red color filter, the color filter CFG is a green color filter, and the color filter CFB is a blue color filter. The color filters CFR, CFG and CFB are formed on the second substrate SUB2 in the example illustrated, but may be formed on the first substrate SUB1.

The liquid crystal layer LQ is sealed between the first alignment film AL1 and the second alignment film AL2.

The light source device LS is opposed to the first substrate SUB1. Various types of the devices are applicable as the light source device LS, but detailed explanations of the structure are omitted here.

A first optical element OD1 including a first polarizer PL1 is disposed on an outer surface of the first insulating substrate 100. A second optical element OD2 including a second polarizer PL2 is disposed on an outer surface of the second insulating substrate 200. For example, a first absorption axis of the first polarizer PL1 and a second absorption axis of the second polarizer PL2 are perpendicular to each other.

The pixels composed of the red pixels PXR, the green pixels PXG, and the blue pixels PXB are arrayed with a pitch P1.

Figure 4:
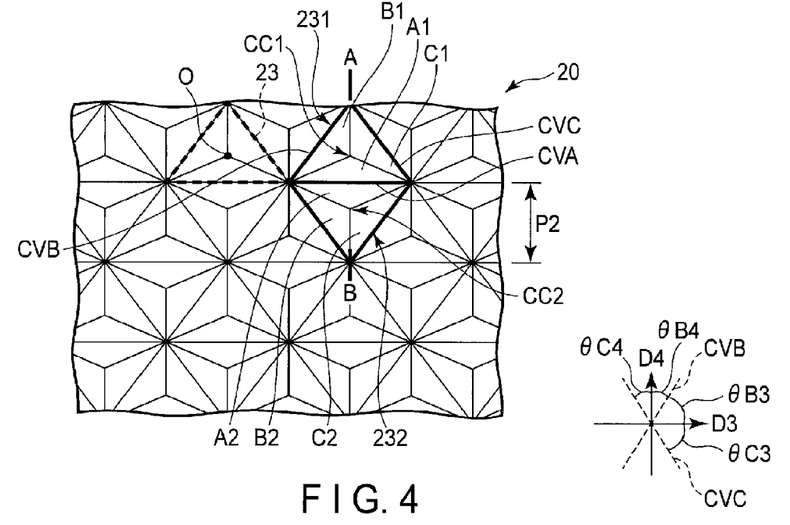
FIG. 4 is a plan view showing a configuration example of the retroreflective element 20 shown in FIG. 1.

FIG. 4 is a plan view showing a configuration example of the retroreflective element 20 shown in FIG. 1. A plane defined by a third direction D3 and a fourth direction D4 which intersect each other is illustrated in the plan view.

The retroreflective element 20 is composed of retroreflectors 23. Each of the retroreflectors 23 is shaped in a regular triangle in the plan view. In the retroreflector 23, its center O is recessed toward the back of the paper in the figure to form the recess portion CC of the retroreflective surface 20A shown in FIG. 1. Boundaries of the adjacent retroreflectors 23 are represented by dotted lines in FIG. 4 and correspond to the protruding portion CV of the retroreflective surface 20A. The retroreflectors 23 are arrayed in the third direction D3. The retroreflectors 23 are also arrayed with a pitch P2 in the fourth direction D4. However, the retroreflectors 23 adjacent in the third direction D3 and the fourth direction D4 are shaped to be inversed by 180°.

In the figure, a retroreflector 231 includes three reflective surfaces A1, B1, and C1 which intersect each other. The retroreflector 231 includes a recess portion CC1 surrounded by the reflective surfaces A1, B1, and C1. The retroreflector 231 and a retroreflector 232 are arranged in the fourth direction D4. The retroreflector 232 includes three reflective surfaces A2, B2, and C2 which intersect each other. The retroreflector 232 includes a recess portion CC2 surrounded by the reflective surfaces A2, B2, and C2. An intersection between the reflective surface A1 of the retroreflector 231 and the reflective surface A2 of the retroreflector 232 forms a protruding portion CVA on the retroreflective surface. The protruding portion CVA extends in a direction parallel to the third direction D3. The retroreflector 231 and the retroreflector 232 are in a positional relationship of line symmetry about the protruding portion CVA. Similarly to this, the boundaries of the adjacent retroreflectors 23 correspond to the protruding portions. In other words, the outer shape (triangle) of each of the retroreflectors 23 is defined by the protruding portions. The outer shape of the retroreflector 231 is defined by the protruding portions CVA, CVB and CVC. The protruding portions CVB and CVC extend in the directions intersecting the third direction D3 and the fourth direction D4, respectively. For example, the extending direction of the protruding portion CVB makes an angle $\theta B3$ of 60° with the third direction D3, and makes an angle $\theta B4$ of 30° with the fourth direction D4. The extending direction of the protruding portion CVC makes an angle θC3 of 60° with the third direction D3, and makes an angle θC4 of 30° with the fourth direction D4.

The resolution of the real image I1 depends on the pitch P2 of the retroreflector 23. To suppress deterioration in resolution, the pitch P2 is desirably smaller than the pitch P1 of the pixels on the display panel PNL shown in FIG. 3.

Figure 5:
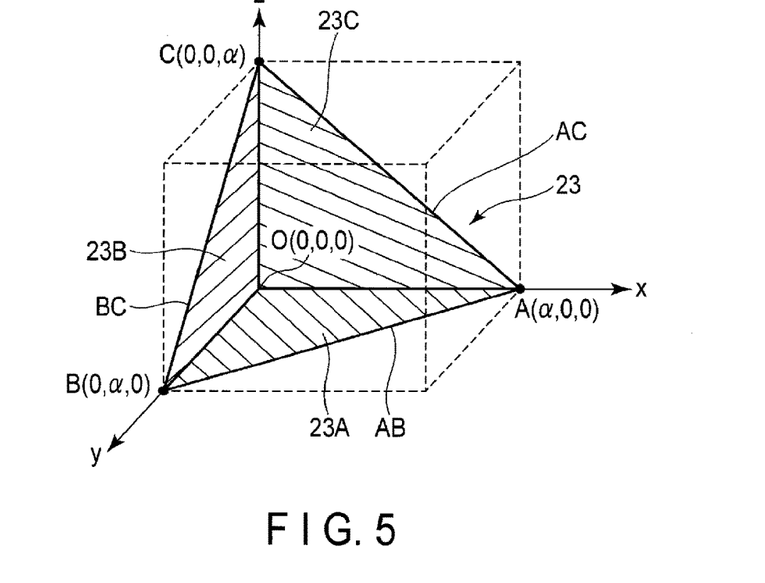
FIG. 5 is a perspective view showing a configuration example of the retroreflector 23 shown in FIG. 4.

FIG. 5 is a perspective view showing a configuration example of the retroreflector 23 shown in FIG. 4. The shape of the retroreflector 23 will be explained by using xyz-coordinate systems which x-axis, y-axis, and z-axis intersect each other.

The retroreflector 23 includes three reflective surfaces 23A, 23B, and 23C in the xyz-coordinate systems. The reflective surfaces 23A to 23C have the same shape and are shaped in a right-angled isosceles triangle. The reflective surfaces 23A to 23C intersect each other. The retroreflector 23 including the reflective surfaces 23A to 23C having such a shape is called a corner cube or a corner reflector.

When point A ($\alpha$, 0, 0) is located on the x-axis, point B (0, $\alpha$, 0) is located on the y-axis and point C (0, 0, $\alpha$) is located on the z-axis, the reflective surface 23A is formed in the x-y plane and defined by origin O, point A, and point B. The reflective surface 23B is formed in the y-z plane and defined by origin O, point B, and point C. The reflective surface 23C is formed in the x-z plane and defined by origin O, point A, and point C. Line segment AB which connects points A and B, line segment BC which connects points B and C, and line segment AC which connects points A and C correspond to the protruding portion.

The retroreflector 23 does not include a plane defined by three points A, B, and C. In other words, the internal side surrounded by three reflective surfaces 23A to 23C corresponds to the recess portion, which is an air layer. In the retroreflector 23, retroreflection in which the incident light pass in substantially the same optical paths as those of the incident light by being reflected on three reflective surfaces 23A to 23C is implemented. However, vicinities of three points A, B, and C can be non-retroreflective portions at which the light is not retroreflected, i.e., the light is not reflected on three reflective surfaces.

The shape of the retroreflector 23 is not limited to that in the example illustrated, but may be the shape of the retroreflector from which the non-retroreflective portions are removed.

Figure 6:
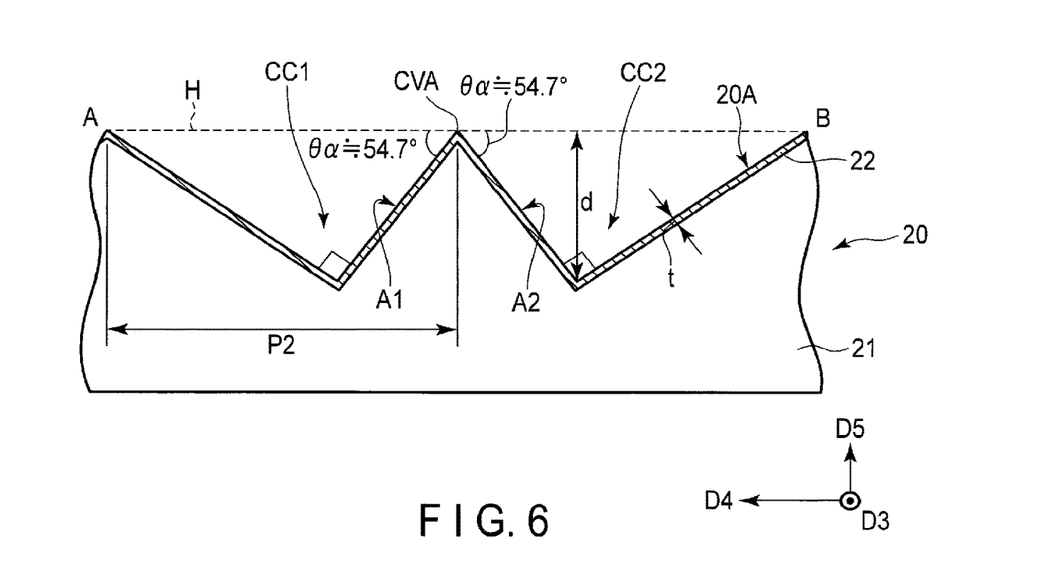
FIG. 6 is a cross-sectional view showing a structure of the retroreflective element 20 as cut along line A-B shown in FIG. 4.

FIG. 6 is a cross-sectional view showing a structure of the retroreflective element 20 as cut along line A-B shown in FIG. 4. As shown in the figure, the retroreflective surface 20A formed on the surface of the metallic thin film 22 includes recess portions CC1 and CC2 which are recessed to a horizontal plane (i.e., a plane parallel to the plane defined by the third direction D3 and the fourth direction D4) H represented by a broken line. A cross-section formed by the horizontal plane H and the retroreflective surface 20A represents a right-angled triangle, and horizontal plane H corresponds to a hypotenuse. An angle θα made by the horizontal plane H and the reflective surface A1 is equal to an angle θα made by the horizontal plane H and the reflective surface A2 and is, for example, approximately 54.7°.

For example, if the pitch P1 of the pixels on the display panel PNL is 200 μm, the pitch P2 of the retroreflector at the retroreflective element 20 is 180 μm, and the pitch P2 is smaller than the pitch P1. In addition, the retroreflective surface 20A has depth d along a fifth direction D5 corresponding to the normal direction of the horizontal plane H.

The depth d is, for example, 73.5 μm. The thickness t of the metallic thin film 22 is 150 nm, which is much smaller than the depth d. For this reason, the surface of the base 21 similar to the retroreflective surface 20A cannot be filled with the metallic thin film 22 or cannot collapse the retroreflective surface 20A when the metallic thin film 22 is formed.

Figure 7:
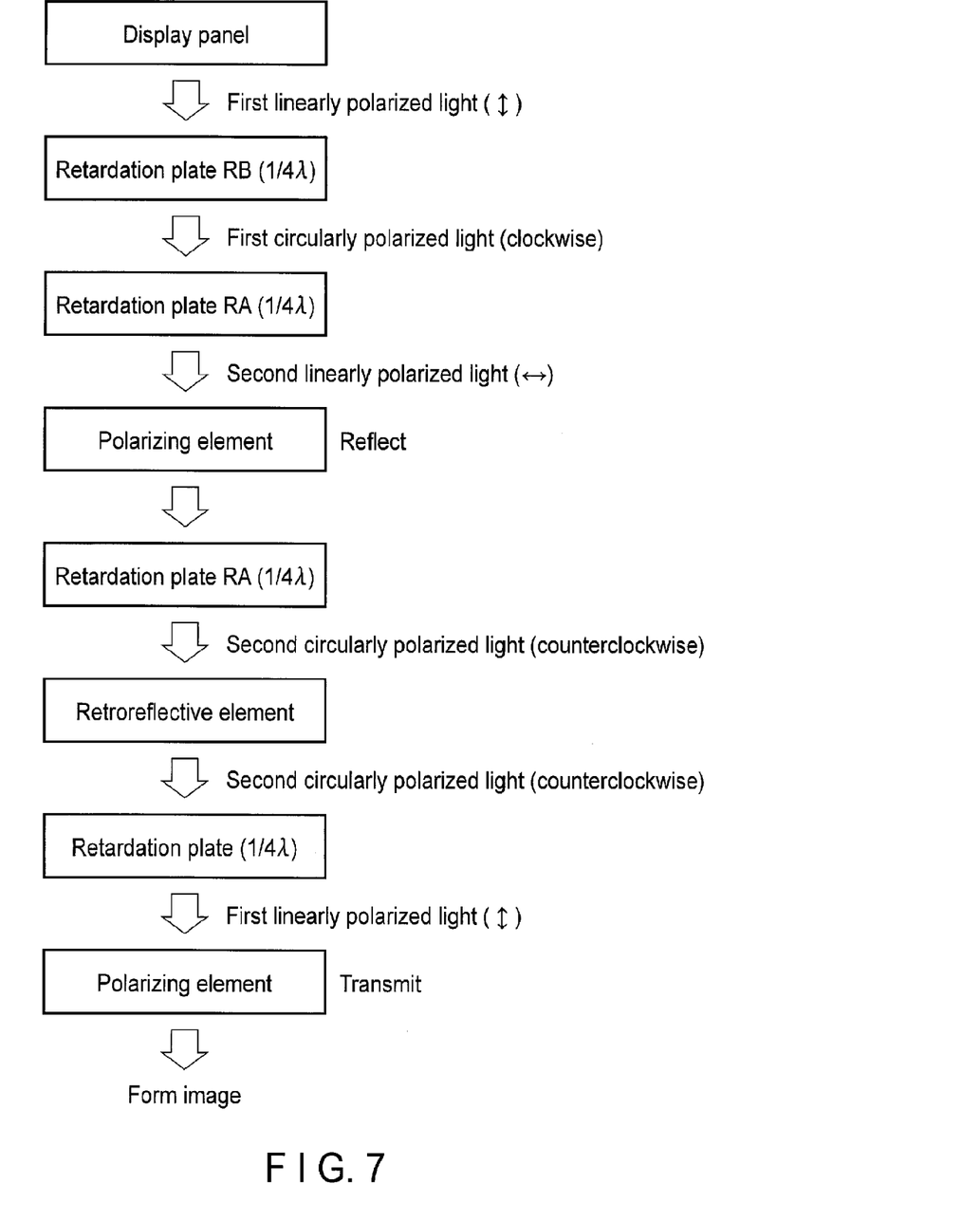
FIG. 7 is a diagram for explanation of functions of respective constituent elements in the display device 1.

Next, functions of the respective constituent elements to form the display image I0 on the display module DSP as the real image I1 will be explained with reference to FIG. 1 and FIG. 7.

First, the display panel PNL of the display module DSP emits first linearly polarized light corresponding to the display light of the display image I0. The first linearly polarized light has a polarization plane parallel to the transmission axis of the polarizing element 10, and corresponds to the linearly polarized light which transmits the polarizing element 10. The first linearly polarized light transmits the retarder element RB and is converted into first circularly polarized light. The first circularly polarized light draws a spiral locus which rotates clockwise as seen from a direction opposite to the direction of travel of the light. The display module DSP thereby emits the display light which is the first circularly polarized light.

Next, the display light which is the first circularly polarized light transmits the retarder element RA and is converted into second linearly polarized light. The second linearly polarized light has a polarization plane perpendicular to the transmission axis of the polarizing element 10. The second linearly polarized light is reflected by the polarizing element 10, transmits the retarder element RA and is converted into second circularly polarized light. The second circularly polarized light draws a spiral locus which rotates counterclockwise as seen from the direction opposite to the direction of travel of the light. In other words, the second circularly polarized light is the circularly polarized light in an opposite direction to the first circularly polarized light.

Next, the second circularly polarized light is made incident on the retroreflective element 20. The incident light of the retroreflective element 20 is retroreflected on the retroreflective surface 20A. At this time, the retroreflected light is the second circularly polarized light. The second circularly polarized light transmits the retarder element RA again and is converted into the first linearly polarized light. The first linearly polarized light transmits the polarizing element 10, and an image of the light is formed as the real image I1 representing the display image I0. The observer can observe the real image I1 floating in air from the direction opposed to the direction of travel of the first linearly polarized light transmitting the polarizing element 10.

According to the present embodiments, the other reflective surface (i.e., an even surface of an optical member, an interface between optical members or the like) is not disposed between the retarder element RA and the retroreflective surface 20A. For this reason, the circularly polarized light transmitting the retarder element RA is retroreflected on the retroreflective surface 20A while no reflected light is generated on the other reflective surface. Since the retroreflective surface 20A retroreflects most of incident light, transmission of the light on the retroreflective surface 20A can be suppressed. If the retroreflective surface 20A is particularly formed of a metallic thin film, transmission of the light on the retroreflective surface 20A can be further suppressed. In other words, reflection on the back surface 20B on the side opposite to the retroreflective surface 20A can be controlled at the retroreflective element 20.

Therefore, occurrence of ghost can be suppressed, and deterioration in the display quality of the real image I1 observed by forming the image of the retroreflected light can also be suppressed. In addition, the reduction in light use efficiency can be suppressed since reflected light is not generated on the other reflective surface and most of the light incident on the retroreflective element 20 is retroreflected and contributes to display of the real image I1.

The external light traveling toward the retroreflective element 20 via the polarizing element 10 converted into the first linearly polarized light and then transmits the retarder element RA, which is the λ/4 plate before and after reflected on the retroreflective surface 20A. For this reason, the external light is converted into the second linearly polarized light and cannot transmit the polarizing element 10. In other words, occurrence of ghost due to the external light can be suppressed.

Next, a modified example of the present embodiments will be described. The same constituent elements as those of the above-explained configuration example are denoted by like reference numerals and their explanations are omitted.

Figure 8:
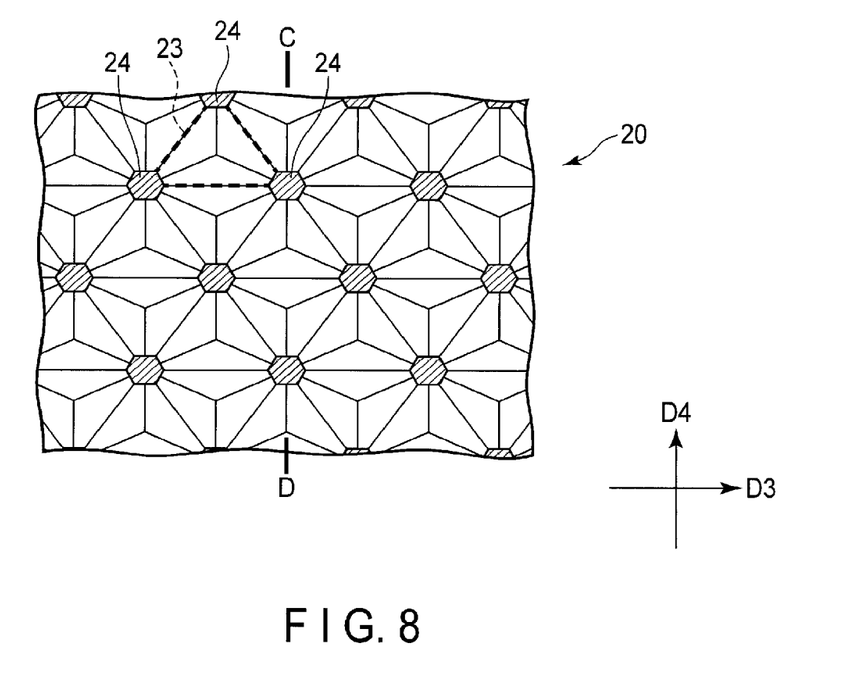
FIG. 8 is a plan view for explanation of a non-retroreflective portion 24 in the retroreflective element 20.

FIG. 8 is a plan view for explanation of a non-retroreflective portion 24 in the retroreflective element 20. In the example illustrated, the non-retroreflective portion 24 is adjacent to the retroreflector 23 substantially shaped in a regular triangle. For example, if the single retroreflector 23 is noticed, the non-retroreflective portions 24 are formed near three angular portions of the retroreflector 23. If the single non-retroreflective portion 24 is noticed, the portion is adjacent to six retroreflectors 23, and is formed in a regular hexagon in a plane defined by the third direction D3 and the fourth direction D4.

If the reflected light on the non-retroreflective portion 24 transmits the polarizing element 10, the reflected light may affect the real image I1.

Figure 9:
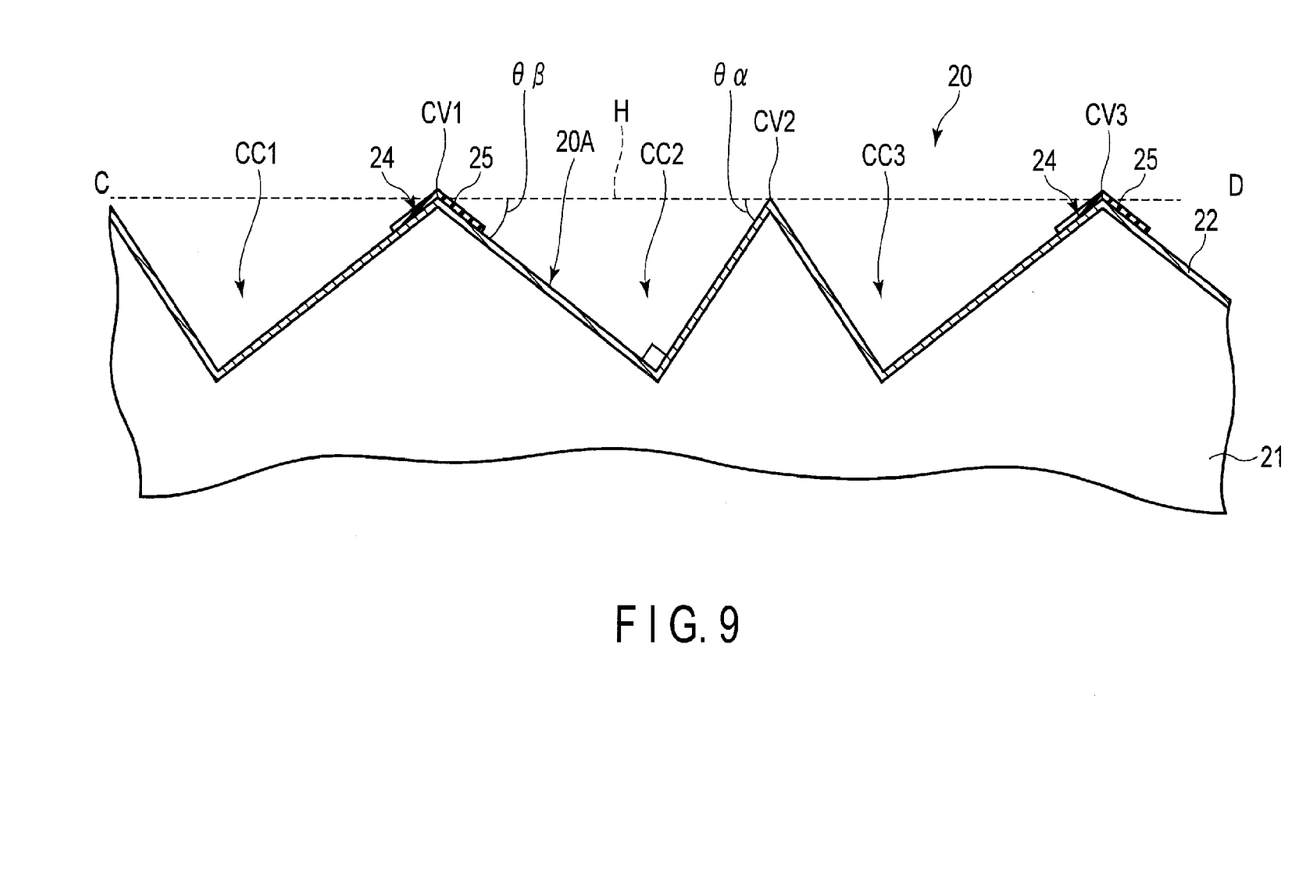
FIG. 9 is a cross-sectional view showing the structure of the retroreflective element 20 as cut along line C-D shown in FIG. 8.

FIG. 9 is a cross-sectional view showing the structure of the retroreflective element 20 as cut along line C-D shown in FIG. 8. The retroreflective surface 20A includes recess portions CC1 to CC3 recessed from the horizontal plane H represented by a broken line in the figure, and protruding portions CV1 to CV3 between adjacent recess portions, similarly to the retroreflective surface 20A explained with reference to FIG. 6. Top portions of the protruding portions CV1 and CV3, of the protruding portions CV1 to CV3, correspond to the non-retroreflective portions 24, and their area is shielded by the light-shielding film 25. If the recess portion CC2 alone is noticed, a cross-section formed by the horizontal plane H and the retroreflective surface 20A is shaped in a right-angled triangle, and the horizontal plane H corresponds to the hypotenuse. Angles θα and θβ made by the horizontal plane H and the retroreflective surface 20A are acute angles, and the angle θβ is smaller than the angle θα. The non-retroreflective portion 24 is located at the top portion of the protruding portion CV1, of the retroreflective surface 20A making the angle θβ. The non-retroreflective portion 24 is not formed at the top portion of the protruding portion CV2. Thus, the non-retroreflective portion 24 is located at the top portion of one of protruding portions, and is located on a side facing the retarder element RA, similarly to the recess portion CC, as explained with reference to FIG. 1.

The light-shielding film 25 is formed of, for example, a black-colored resin material or a low-reflectance metallic material. Undesired reflectance on the non-retroreflective portion 24 can be thereby suppressed. For this reason, deterioration in display quality of the real image I1 can be further suppressed.

To shield the non-retroreflective portion 24 from the light (or suppress the reflection on the non-retroreflective portion 24), the non-retroreflective portion 24 may be cut or the metallic thin film 22 located at the non-retroreflective portion 24 may be removed. However, if the base 21 is formed of a transparent material, the non-retroreflective portion 24 is desirably shielded from the light by the light-shielding film 25 as illustrated since the light transmitting the non-retroreflective portion 24 may be reflected on the back surface, which is the opposite side to the retroreflective surface 20A.

Figure 10:
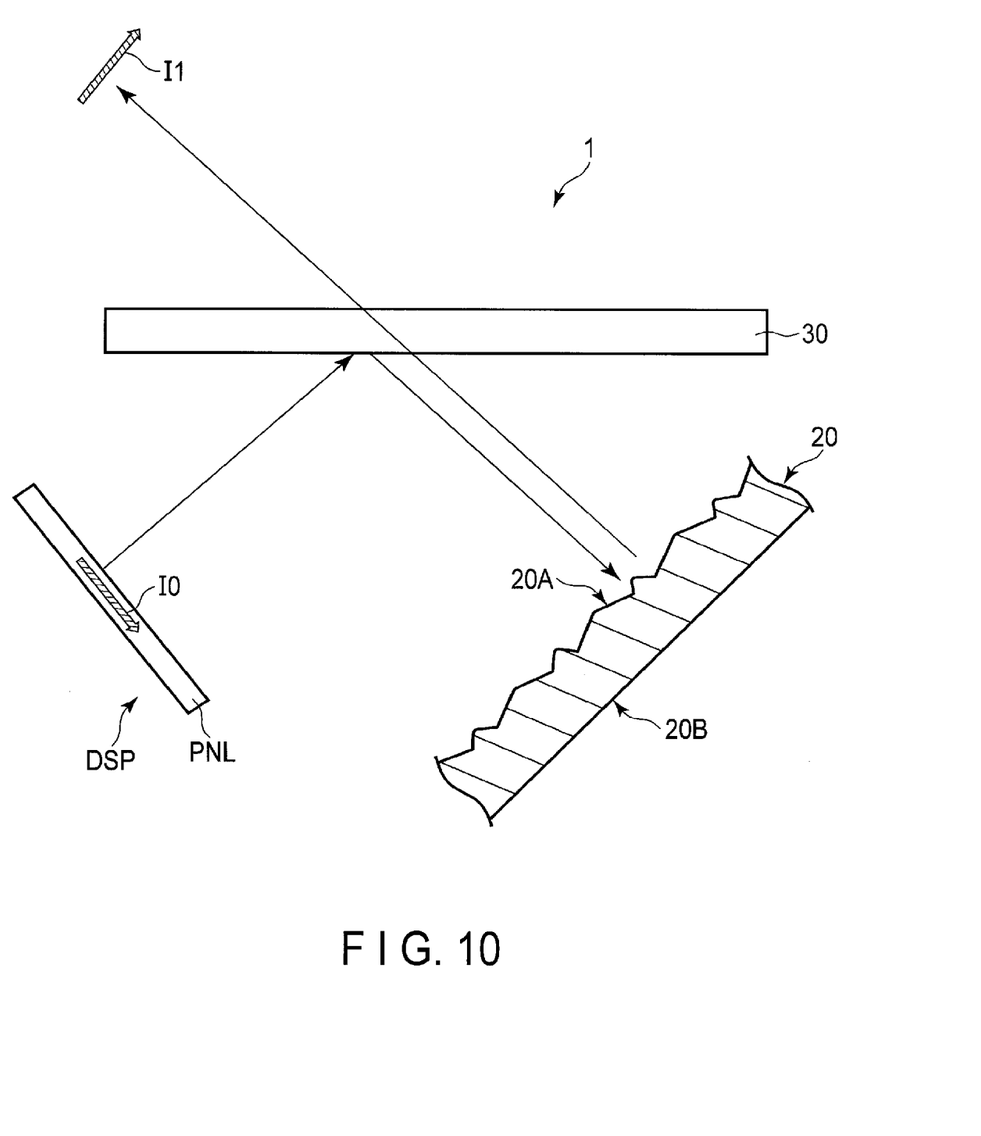
FIG. 10 is an illustration showing another configuration example of the display device 1 of the present embodiments.

FIG. 10 is an illustration showing another configuration example of the display device 1 of the present embodiments.

The configuration example shown in FIG. 10 is different from the configuration example in FIG. 1 with respect to a feature that the polarizing element and the retarder element are replaced by a beam splitter 30. The beam splitter 30 has a function of reflecting part of the incident light and transmitting part of the incident light. For example, the beam splitter 30 may be a half-mirror in which the reflectance and the transmittance of the incident light are substantially equal to each other or a polarizing beam splitter similar to the polarizing element 10. The reflectance and the transmittance of the beam splitter 30 can be set arbitrarily. The retroreflective element 20 includes an uneven retroreflective surface 20A on which the light reflected by the beam splitter 30 is retroreflected toward the beam splitter 30. In other words, the retroreflective surface 20A is located on a side opposed to the beam splitter 30. The retarder element RB shown in FIG. 1 may not be provided in the display module DSP.

In this configuration example, the display light of the display image T0 at the display module DSP is reflected by the beam splitter 30. The light reflected by the beam splitter 30 is made incident on the retroreflective surface 20A of the retroreflective element 20 and retroreflected toward the beam splitter 30. The retroreflected light transmits the beam splitter 30 and forms an image as the real image I1 representing the display image I0. The observer can observe the real image I1 floating in air from the direction opposed to the direction of travel of the light transmitting the beam splitter 30.

In this configuration example, too, the other reflective surface (i.e., an even surface of an optical member, an interface between optical members or the like) is not disposed between the beam splitter 30 and the retroreflective surface 20A. For this reason, the light reflected by the beam splitter 30 is retroreflected on the retroreflective surface 20A while no reflected light is generated on the other reflective surface.

Therefore, occurrence of ghost can be suppressed, and deterioration in the display quality of the real image I1 observed by forming the image of the retroreflected light can also be suppressed, similarly to the above-explained configuration example.

Figure 11:
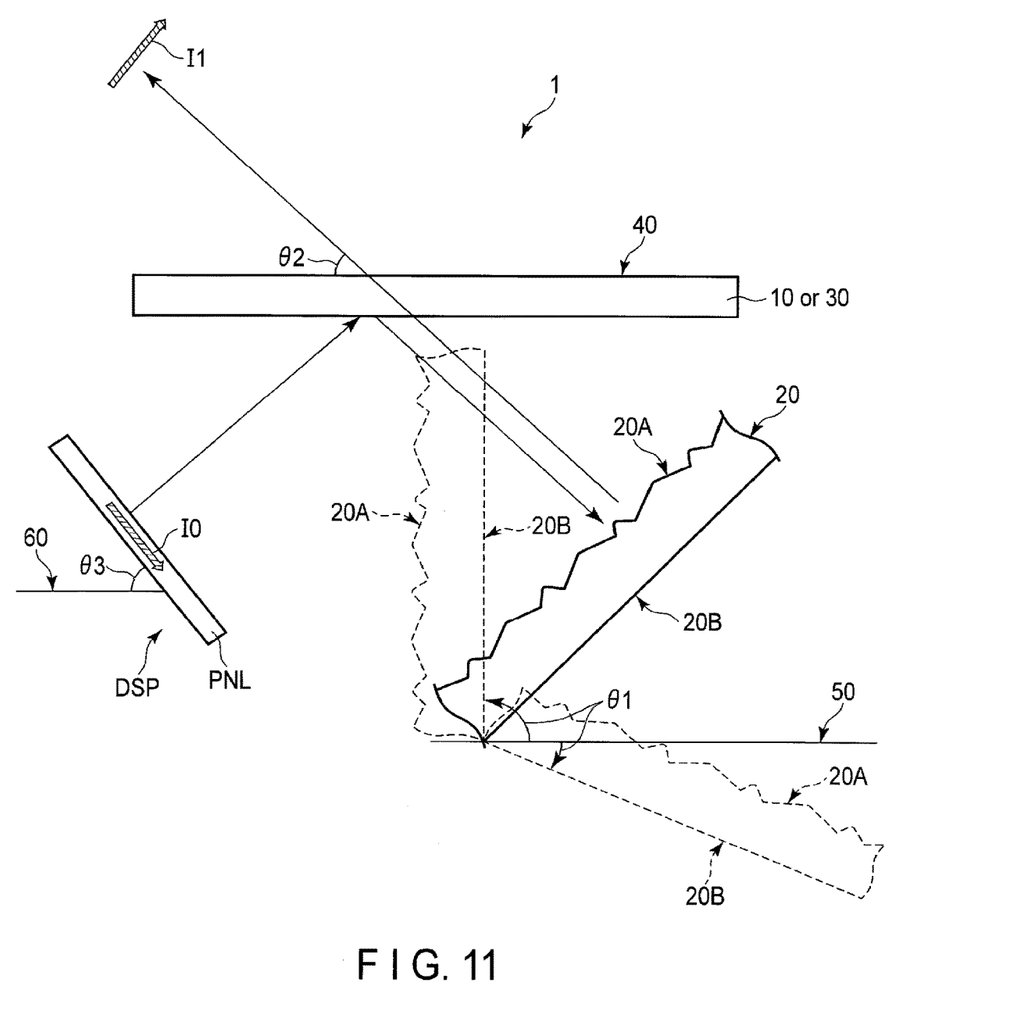
FIG. 11 is an illustration for explanation of an arrangement example of the retroreflective element 20.

FIG. 11 is an illustration for explanation of an arrangement example of the retroreflective element 20. Constituent elements necessary for explanations alone are shown in the figure, but the display module and the like are not illustrated.

In the present embodiments, the polarizing element shown in FIG. 1 or the beam splitter 30 shown in FIG. 10 is formed in a planar shape and includes an even main surface 40. The retroreflective element 20 is disposed at angle θ1 with respect to a reference plane 50 parallel to the main surface 40. The angle θ1 corresponds to an angle made between an even back surface 20B of the retroreflective element 20 and the reference plane 50. In addition, in the figure, an angle counterclockwise with reference to the reference plane 50 is represented as a positive angle, and an angle clockwise with reference to the reference plane 50 is represented as a negative angle. The angle θ1 may be an angle at which the light reflected on the polarizing element 10 or the beam splitter 30 is made incident on the retroreflective surface 20A. In the present embodiments, the angle θ1 is set to be equal to or greater than 0° and equal to or smaller than 90° or equal to or greater than −30° and equal to or smaller than 0°. In the example illustrated, the retroreflective element 20 in a case where the angle θ1 is approximately 45° is represented by a solid line, and the retroreflective element 20 in a case where the angle θ1 is 90° and a case where the angle θ1 is −30° is represented by a dotted line. In the present embodiments, the angle θ1 can be set to be in a wide range since the occurrence of ghost can be suppressed as explained above. The degree of freedom in the layout of the members constituting the display device 1 can be therefore increased. In addition, the direction in which the real image I1 can be observed can easily match the angle θ1 at which a preferable retroreflection property can be obtained at the retroreflective element 20.

In the figure, the angle θ2 made between the direction in which the real image I1 can be observed and the main surface 40 is arbitrarily set in accordance with, for example, a position of the observer who observes the display device 1 or the like. An angle θ3 made between a reference plane 60 parallel to the main surface 40 and the display panel PNL is arbitrarily set so as to allow the real image I1 to be observed at a desired observation position since the position at which the real image I1 is observed is a position in plane symmetry with the display image I0 with respect to the polarizing element 10 or the beam splitter 30.

As explained above, a display device capable of suppressing the deterioration in display quality can be provided by the present embodiments.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Examples of the display device which can be obtained from the configurations described in the present specification will be hereinafter explained.

(1) A display device, comprising:
a polarizing element including a transmission axis transmitting first linearly polarized light, and reflecting second linearly polarized light perpendicular to the transmission axis;
a retarder element adding a retardation to transmitted light; and
a retroreflective element including an uneven retroreflective surface on which incident light is retroreflected, on a side opposed to the retarder element,
display light, which is first circularly polarized light, being converted into second circularly polarized light and reflected on the polarizing element when transmitting the retarder element, being converted into second circularly polarized light turning oppositely to the first circularly polarized light when transmitting the retarder element, being converted into the first linearly polarized light when transmitting the retarder element after reflected on the retroreflective element, and transmitting the polarizing element.

(2) The display device described in (1), wherein the retroreflective surface is formed of a metallic thin film.

(3) The display device described in (1), further comprising a display module emitting display light which is the first circularly polarized light.

(4) The display device described in (3), wherein the display module comprises a display panel including pixels arrayed at a first pitch, the retroreflective element is composed of retroreflectors arrayed at a second pitch, and the second pitch is smaller than the first pitch.

(5) The display device described in (1), wherein the retroreflective element comprises a non-retroreflective portion on the retroreflective surface side, and the non-retroreflective portion is shielded from light.

(6) A display device, comprising:
a beam splitter transmitting and reflecting part of incident light; and
a retroreflective element including an uneven retroreflective surface on which light reflected by the beam splitter is retroreflected toward the beam splitter.

(7) The display device described in (6), wherein the retroreflective element is disposed at an angle equal to or greater than 0° and equal to or smaller than 90° or equal to or greater than −30° and equal to or smaller than 0° with respect to a reference plane parallel to a main surface of the beam splitter.

As described above, a liquid crystal display device capable of improving the display quality can be provided by the present embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a display module emitting display light;
a polarizing element which includes a transmission axis transmitting first linearly polarized light and reflects second linearly polarized light intersecting the transmission axis;
a retroreflective element comprising a base, and first and second retroreflectors each retroreflecting light made incident without transmitting the base; and
a retarder element disposed between the display module and the polarizing element and between the retroreflective element and the polarizing element to add a retardation to transmitted light, wherein
the base includes an even surface,
the first and second retroreflectors are disposed between the even surface and the display module and between the even surface and the retarder element,
the first and second retroreflectors are adjacent to each other,
each of the first and second retroreflectors comprises a recess portion on a side facing the retarder element,
each of the first and second retroreflectors includes three reflective surfaces perpendicular to each other,
the recess portion is surrounded by the three reflective surfaces,
an intersection portion of a first reflective surface of the first retroreflector and a second reflective surface of the second retroreflector forms a protruding portion, and the retroreflective element further comprises a light-shielding film which covers the protruding portion.

2. The display device of claim 1, wherein
the three reflective surfaces are formed of a metallic thin film located on a side opposed to the retarder element of the base.

3. The display device of claim 1, wherein
the display light is circularly polarized light.

4. The display device of claim 1, wherein
the display module comprises a display panel including pixels arrayed at a first pitch,
the first and second retroreflectors are arrayed at a second pitch, and
the second pitch is smaller than the first pitch.

5. The display device of claim 1, wherein
the retroreflective element is disposed at an angle equal to or greater than 0° and equal to or smaller than 90° or equal to or greater than −30° and equal to or smaller than 0° with respect to a reference plane parallel to a main surface of the polarizing element.

6. A display device, comprising:
a display module emitting display light which is circularly polarized light;
a polarizing element transmitting and reflecting part of incident light;
a first retarder element adding a retardation to transmitted light; and
a retroreflective element comprising a base, and retroreflectors each retroreflecting light made incident without transmitting the base, wherein
the first retarder element is disposed between the retroreflectors and the polarizing element,
the base includes an even surface,
the retroreflectors are disposed between the even surface and the first retarder element,
the retroreflective element further comprises a protruding portion between the retroreflectors adjacent to each other, and a light-shielding film which covers the protruding portion, and
light reflected on the retroreflective element and transmitting the first retarder element and the polarizing element is linearly polarized light.

7. The display device of claim 6, wherein
the display module comprises a display panel emitting linearly polarized light, and a second retarder element allowing the linearly polarized light emitted from the display panel to be converted into the circularly polarized light.

8. The display device of claim 7, wherein
the display panel includes pixels arrayed at a first pitch,
the retroreflectors are arrayed at a second pitch, and
the second pitch is smaller than the first pitch.

9. The display device of claim 6, wherein
each of the retroreflectors comprises a recess portion on a side facing the first retarder element.

10. The display device of claim 9, wherein
each of the retroreflectors includes three reflective surfaces perpendicular to each other, and
the recess portion is surrounded by the three reflective surfaces.

11. The display device of claim 10, wherein
the three reflective surfaces are formed of a metallic thin film located on a side opposed to the first retarder element of the base.

12. The display device of claim 6, wherein
the retroreflective element is disposed at an angle equal to or greater than 0° and equal to or smaller than 90° or equal to or greater than −30° and equal to or smaller than 0° with respect to a reference plane parallel to a main surface of the polarizing element.

13. A display device, comprising:
a polarizing element which includes a transmission axis transmitting first linearly polarized light and reflects second linearly polarized light perpendicular to the transmission axis;
a retarder element adding a retardation to transmitted light; and
a retroreflective element comprising a base, retroreflectors each retroreflecting light made incident without transmitting the base, and a light shielding film shielding a non-retroreflective portion adjacent to the retroreflectors from light, wherein
the retarder element is disposed between the retroreflectors and the polarizing element,
the base includes an even surface,
the retroreflectors are disposed between the even surface and the retarder element, and
the retroreflective element further comprises a protruding portion between the retroreflectors adjacent to each other, and a light-shielding film which covers the protruding portion.

14. The display device of claim 13, wherein
the non-retroreflective portion is located on a side facing the retarder element and is formed in a hexagonal shape in a plan view.

15. The display device of claim 13, wherein
each of the retroreflectors comprises a recess portion on a side facing the retarder element.

16. The display device of claim 15, wherein
each of the retroreflectors includes three reflective surfaces perpendicular to each other, and
the recess portion is surrounded by the three reflective surfaces.

17. The display device of claim 15, wherein
the three reflective surfaces are formed of a metallic thin film located on a side opposed to the retarder element of the base.

* * * * *